May 21, 1968  J. D. CAMERON ET AL  3,384,850
PARTIALLY ROLLING, PARTIALLY SLIDING CONTACTOR
FOR ELECTRICAL SLIDEWIRES
Filed Nov. 14, 1966
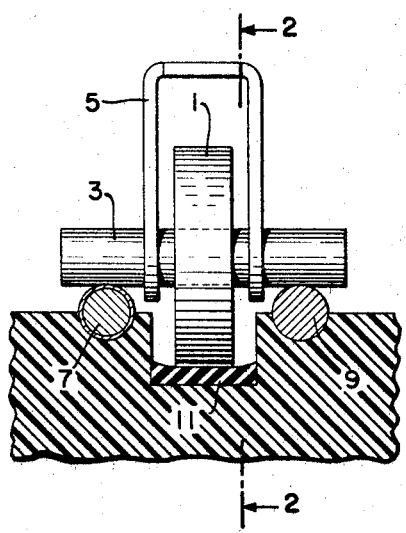
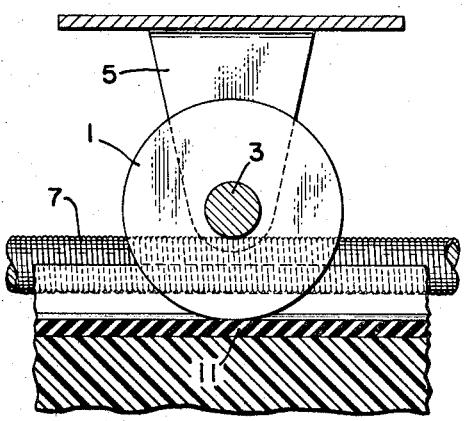
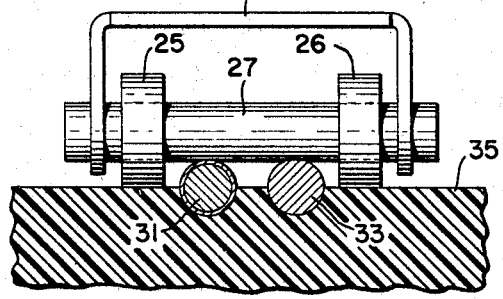
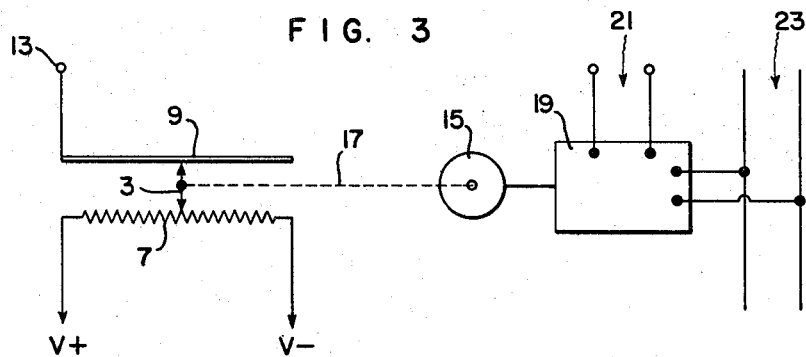
INVENTORS.
ARTHUR E. GEALT
JAMES D. CAMERON
BY Arthur H. Swanson
ATTORNEY.

United States Patent Office 3,384,850
Patented May 21, 1968

3,384,850
PARTIALLY ROLLING, PARTIALLY SLIDING CONTACTOR FOR ELECTRICAL SLIDEWIRES
James D. Cameron and Arthur E. Gealt, Philadelphia, Pa., assignors to Honeywell Inc., Minneapolis, Minn., a corporation of Delaware
Filed Nov. 14, 1966, Ser. No. 593,785
7 Claims. (Cl. 338—158)

ABSTRACT OF THE DISCLOSURE

A partially rolling, partially sliding contact between a contactor and a resistive slidewire is provided by a rotating cylindrical surface means which is driven by a second larger cylindrical surface means. The first smaller cylindrical surface means, which constitutes the actual contactor, is driven at a translational velocity determined by the peripheral velocity of the second cylindrical surface means and rotates at the same angular velocity as the second cylindrical surface means.

Background of the invention

This invention relates to measuring apparatus, and more particularly to an improved contactor for use with electrical slidewires.

Heretofore, slidewire contactors have been used in the art which were positioned by sliding upon electrical slidewire surfaces. Contactor to slidewire friction, however, resulted in substantial wear, noise generation, and often contactor bounce when these prior art sliding contactors were positioned and repositioned at high speeds. As an alternative, rolling contactors were devised which by their smooth continuous action solved the above problems, but in so doing, eliminated the wiping action necessary to keep the slidewire contact surface clean to insure a good connection.

Summary of the invention

It is, accordingly, an object of the present invention to provide an improved contactor for use with electrical slidewires characterized by its controlled wiping action to keep slidewire contact surfaces clean and its reduced contactor to slidewire friction in comparison with prior art sliding contactors.

In accomplishing these and other objects, there is provided in accordance with the present invention, a contactor for use with electrical slidewires comprising a first cylindrical surface means integrally joined with a second smaller cylindrical surface means for conjoint and coaxial rotary motion. A driving means causes the second cylindrical surface means to be positioned along a slidewire by driving the first larger cylindrical surface means. The driving means causes the first cylindrical surface means to roll upon a friction bearing surface. For each revolution of the first cylindrical surface means, the second cylindrical surface means traverses a distance along the slidewire surface equal to the circumference of the first cylindrical surface means. Since the circumference of the second cylindrical surface means is smaller than the circumference of the first cylindrical surface means, the second cylindrical means necessarily simultaneously rolls and slides along the surface of the slidewire. That is to say, the distance the second cylindrical surface means would roll in one revolution, its circumference, is less than the distance the second cylindrical surface means actually moves along the slidewire, and thus this additional distance moved must be accounted for by the second cylindrical surface means sliding along the slidewire surface. Therefore, the present invention provides a slidewire contactor which partially rolls and partially slides across the surface of the slidewire and thereby provides a controlled wiping action with reduced contactor to slidewire friction.

Brief description of the drawings

FIGURE 1 is a pictorial representation of a contactor, according to the present invention, positioned in contact with an electrical resistive slidewire and a collector wire.

FIGURE 2 is a cross-sectional view taken along the line 2—2 of FIG. 1.

FIGURE 3 is a schematic diagram of a circuit in which the contactor, the resistive slidewire, and the collector wire of FIG. 1 are used.

FIGURE 4 is a pictorial representation of a second embodiment of a contactor of the present invention positioned in contact with an electrical resistive slidewire and a collector wire.

Description of the preferred embodiments

Referring now to the drawings in more detail, there is shown in FIGURES 1 and 2 a contactor of the present invention comprising a cylindrical surface means 1, a cylindrical surface means 3, and a positioning arm 5. Also shown, therein, are a resistive slidewire 7, a collector wire 9, and a compressible insulating material 11. The cylindrical surface means 3 of the contactor of the present invention is placed in contact with the resistive slidewire 7 and the collector wire 9 and is maintained in contact therewith by pressure applied through the positioning arm 5. This pressure, which may be applied by means of a spring mechanism or other devices known in the art, causes the cylindrical surface means 1 to compress the insulating material 11. Thus the cylindrical surface means 1 is caused to make firm contact with the material 11. The material 11 serves as the frictional bearing surface for the cylindrical surface means 1 and this firm contact tends to prevent slippage between the cylindrical surface means 1 and its frictional bearing surface.

The cylindrical surface means 3 is made of a conductive material and electrically connects the resistive slidewire 7 to the collector wire 9. In FIGURES 1 and 2, this connection is accomplished by the extension of the cylindrical surface means 3 physically through the cylindrical surface means 1. This electrical connection, however, could be effected by making the cylindrical surface means 3 of two identical separate cylindrical elements with each element placed on an opposite side of the cylindrical surface means 1 and then by making the cylindrical surface means 1 and 3 of the same conductive material.

The cylindrical surface means 1 and 3 are integrally joined for conjoint and coaxial rotary motion and the cylindrical surface means 1 has a circumference larger than that of the cylindrical surface means 3. Positioning of the contactor is accomplished by applying force, by means of a driving means well known in the art, through the positioning arm 5 and thereby causing the cylindrical surface means 1 to roll along its bearing surface. As the cylindrical surface means 1 rolls along this bearing surface, the cylindrical surface means 3 is positioned upon the resistive slidewire 7 and the collector wire 9. Since the cylindrical surface means 1 has a circumference larger than that of the cylindrical surface means 3, the cylindrical surface means 3 is caused to partially slide and partially roll along the surface of the slidewire 7 and the collector wire 9.

FIG. 3 shows, in addition to those elements identified in FIGURES 1 and 2, an output terminal 13, a driving motor 15, driving linkage 17, an amplifier 19, amplifier input terminals 21, and power lines 23. In operation, V+ and V— voltages are applied to the opposite terminals of the slidewire resistor 7 and the cylindrical surface means 3 is positioned along the slidewire resistor 7 to pick off the desired voltage in the V+ to V— range. This voltage is transferred to the output terminal 13 via the collector wire 9. The contactor is positioned by driving forces from the driving motor 15 which are applied by means of the driving linkage 17. A reversible direction A.C. driving motor may be used. The direction and the rate at which the contactor is driven is determined by the input signal on the terminals 21 of the amplifier 19 and the input signal will cease to be applied to the terminals 21 once the contactor has been driven to the desired position. The amplifier 19 serves to amplify the input signal on the amplifier terminals 21 and feeds the driving signal to the driving motor 15. An A.C. amplifier of a type well known in the art may be used to feed the driving motor 15. The driving motor 15 and the amplifier 19 receive power through the power lines 23.

A second embodiment of a contactor of the present invention is shown in FIG. 4 and is comprised of identical cylindrical surface means 25 and 26, a cylindrical surface means 27, and a positioning arm 29. The contactor is positioned upon a resistive slidewire 31 and a collector wire 33. The cylindrical surface means 27 physically extends through the larger cylindrical surface means 25 and 26. The cylindrical surface means 27 is made of a conductive material to electrically connect the slidewire 31 and the collector wire 33. The cylindrical surface means 25 and 26 may be made from a compressible insulating material, e.g. hard rubber, so that pressure applied through the positioning arm 29 will cause the cylindrical surface means 27 to be maintained in firm contact with the slidewire 31 and the collector wire 33, and at the same time will cause the cylindrical surface means 25 and 26 to make firm contact with a bearing surface 35.

Positioning of the contactor of FIGURE 4 is accomplished by applying force, by means of driving means well known in the art, through the positioning arm 29 and thereby causing the cylindrical surface means 25 and 26 to roll along the bearing surface 35. As the cylindrical surface means 25 and 26 roll along the bearing surface 35, the cylindrical surface means 27 is positioned upon the resistive slidewire 31 and the collector wire 33. The cylindrical surface means 27 will then partially slide and partially roll along the surfaces of the slidewire 31 and the collector wire 33 since the cylindrical surface means 27 has a smaller circumference that that of the cylindrical surface means 25 and 26.

Other embodiments of the invention could be made in which the contactor would be comprised of one or a plurality of first cylindrical surface means and one or a plurality of second smaller cylindrical surface means integrally joined for conjoint and coaxial rotary motion in various combinations and in which the second cylindrical surface means could be comprised of one conductive material or could be composed of separate insulated sections.

Thus there has been provided an improved contactor for use with electrical slidewires characterized by its controlled wiping action to keep slidewire contact surfaces clean and its reduced contactor to slidewire friction.

The embodiments of the invention in which an exclusive property or privilege is claimed are defined as follows:

1. A contact element having a first cylindrical surface means and a second cylindrical surface means integrally joined for conjoint and coaxial rotary motion, said first cylindrical surface means having a diameter larger than the diameter of said second cylindrical surface means, a first frictional bearing surface positioned to engage said first cylindrical surface means, a second frictional surface positioned to engage said second cylindrical surface means, and driving means for driving said contact element in rolling contact with said first frictional surface whereby to cause said second cylindrical surface means to move in partially rolling, partially sliding contact with said second frictional surface.

2. The apparatus of claim 1 wherein said second frictional surface comprises a surface of an electrical conductor and wherein said second cylindrical surface means is an electrically conductive member.

3. The apparatus of claim 1 wherein a third frictional surface is positioned to engage said second cylindrical surface means wherein said second and third fritcional surfaces are surfaces of electrical conductors and wherein said second cylindrical surface means is an electrically conductive member and constitutes means for variably interconnecting said electrical conductors.

4. The apparatus of claim 3 wherein said second cylindrical surface means extends through said first cylindrical surface means.

5. The apparatus of claim 3 wherein said second and third frictional surfaces extend in a parallel spaced relative to each other.

6. The apparatus of claim 1 wherein a third cylindrical surface means is integrally joined with said second cylindrical surface means for conjoint and coaxial rotary motion, said third cylindrical surface means having a diameter equal to said first cylindrical surface means, and wherein a third frictional surface is positioned to engage said third cylindrical surface means.

7. The apparatus of claim 3 wherein one of said electrical conductors is a slidewire resistor and the other of said conductors is a collector wire and said second cylindrical surface means comprises a movable contactor for said slidewire.

References Cited

UNITED STATES PATENTS

| | | | |
|---|---|---|---|
| 2,256,833 | 9/1941 | McDonald | 338—158 X |
| 2,885,519 | 5/1959 | Louis et al. | 338—158 X |

ROBERT K. SCHAEFER, *Primary Examiner.*

H. J. HOHAUSER, *Assistant Examiner.*

UNITED STATES PATENT OFFICE
CERTIFICATE OF CORRECTION

Patent No. 3,384,850

May 21, 1968

James D. Cameron et al.

It is certified that error appears in the above identified patent and that said Letters Patent are hereby corrected as shown below:

Column 4, line 36, after "parallel spaced" insert -- manner --.

Signed and sealed this 28th day of October 1969.

(SEAL)
Attest:

Edward M. Fletcher, Jr.
Attesting Officer

WILLIAM E. SCHUYLER, JR.
Commissioner of Patents